(12) United States Patent
Baginski et al.

(10) Patent No.: US 7,216,730 B2
(45) Date of Patent: May 15, 2007

(54) DRIVING SYSTEM FOR AN INDUSTRIAL TRUCK

(75) Inventors: Ralf Baginski, Neetze (DE); Rainer Bruns, Kirchenheide (DE); George Nissen, Kiebitzflehr (DE); Stefan Steiger, Frankisch-Grumbach (DE)

(73) Assignee: Jungheintich Atkiengesellschaft, Hamburg (DE)

( * ) Notice: Subject to any disclaimer, the term of this patent is extended or adjusted under 35 U.S.C. 154(b) by 0 days.

(21) Appl. No.: 11/147,684

(22) Filed: Jun. 8, 2005

(65) Prior Publication Data

US 2005/0274554 A1 Dec. 15, 2005
US 2006/0196710 A2 Sep. 7, 2006
US 2006/0278448 A2 Dec. 14, 2006

(30) Foreign Application Priority Data

Jun. 12, 2004 (DE) ...................... 10 2004 028 620

(51) Int. Cl.
*B60K 1/00* (2006.01)

(52) U.S. Cl. .......................... 180/65.2; 180/65.7; 475/5

(58) Field of Classification Search .............. 180/65.2, 180/65.4, 65.7, 65.8, 249, 65.3; 310/115, 310/539; 475/295, 332, 208, 5; 290/10, 290/18, 22
See application file for complete search history.

(56) References Cited

U.S. PATENT DOCUMENTS

| | | | | |
|---|---|---|---|---|
| 3,503,281 | A | * 3/1970 | Gsching et al. ................ | 475/5 |
| 5,674,147 | A | * 10/1997 | Tobita et al. ................ | 475/295 |
| 6,005,358 | A | * 12/1999 | Radev ........................ | 318/139 |
| 6,007,443 | A | * 12/1999 | Onimaru et al. ................ | 475/5 |
| 6,044,922 | A | * 4/2000 | Field ......................... | 180/65.2 |
| 6,413,185 | B1 | * 7/2002 | Baginski et al. ............ | 475/208 |
| 6,543,311 | B1 | * 4/2003 | Baginski et al. ............... | 475/5 |
| 6,554,088 | B2 | * 4/2003 | Severinsky et al. ........ | 180/65.2 |
| 6,589,130 | B1 | * 7/2003 | Baginski et al. ........... | 180/65.2 |
| 6,921,984 | B2 | * 7/2005 | Rogg .......................... | 290/10 |

FOREIGN PATENT DOCUMENTS

| | | |
|---|---|---|
| DE | 38 15 780 A1 | 1/1988 |
| DE | 198 03 160 C1 | 5/1999 |
| DE | 199 55 311 A1 | 5/2001 |

(Continued)

*Primary Examiner*—Hau Phan
(74) *Attorney, Agent, or Firm*—Vidas, Arrett & Steinkraus, P.A.

(57) ABSTRACT

Driving system for a an industrial truck with a combustion engine, a two-branch gear transmission whose first shaft is coupled to the combustion engine, whose second shaft is coupled to a change-over transmission, whose outlet acts on the driven wheels of the industrial truck via a collecting transmission, an electric transmission of which a first electric machine cooperates therewith, with respect to the torque, using the two-branch gear transmission, and a second electric machine is coupled via at least one collecting transmission to the driven wheels, the two-branch gear transmission producing a constant torque ratio between the first electric machine and at least the first and second shaft and an electrical circuit arrangement electrically coupling the electric machines and being connected to an electric accumulator, two mechanical hydraulic converters of which one is coupled to the first or second shaft of the two-branch gear transmission and the second to the electric transmission, and devices for the absorption of hydraulic energy which are associated with each mechanical hydraulic converter.

9 Claims, 5 Drawing Sheets

FOREIGN PATENT DOCUMENTS

| | | |
|---|---|---|
| DE | 199 55 313 A1 | 5/2001 |
| DE | 199 55 312 A1 | 6/2001 |
| DE | 101 41 923 A1 | 3/2002 |
| DE | 197 47 459 C2 | 2/2003 |
| DE | 1 403 130 A1 | 8/2003 |

* cited by examiner

DRIVING SYSTEM FOR AN INDUSTRIAL TRUCK

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Combustion engine driven industrial trucks require a transmission in order to provide the desired torque at the desired speed. It is desirable that the industrial truck can be driven forwards and backwards at the same high maximum speed.

In motor vehicles, it is known to use a clutch and a hydrokinetic converter in combination with single-step or multi-step transmissions. However, such a system has only limited suitability for industrial trucks, as at low driving speeds it has low efficiency. Furthermore, a clutch function is required for the independent operation of the lifting function of the industrial truck.

The disadvantages of a hydrodynamic transmission system do not occur with a hydrostatic drive train. It uses a continuously variable conversion range and allows easy reversing. However, the poor efficiency at faster driving speeds opposes the relatively high efficiency of driving at slower speeds. As a result of the multiple hydraulic-mechanical conversion of the total driving power, the efficiency of a mechanical gear changing mechanism is not achieved. A further disadvantage is the relatively high construction cost, due to the high hydraulic pressures up to 400 bar and the susceptibility of the system to defects, in particular with regard to leakage.

Finally, it is also known in the industrial truck field to carry out the transmission of forces by means of an electric transmission. In an electric transmission, all the energy generated by the combustion engine is converted into electrical energy by means of a generator. The electrical energy is reconverted into mechanical energy by means of an electric motor. Within predefined limits, drive controls for electric machines allow any gear ratios between the generator and electric motor. Hence, such a system has the advantage of particularly good controllability. The low efficiencies caused by the high losses in the control mechanisms and electric machines are, however, disadvantageous.

Existing driving solutions in combustion engine operated industrial trucks generally involve considerable energy losses in certain operating situations. Furthermore, they are not capable of returning energy to an accumulator when braking or lowering loads. Emissionless operation is also impossible which almost excludes the use of such industrial trucks in enclosed spaces. A further disadvantage of the former driving systems lies in the fact that the components have to be designed for peak loads whilst the mean loading of the components is clearly below such values. Thus a higher construction cost is incurred which is not required for the mean value.

A continuously variable, hydrostatic-mechanical power shift transmission for industrial trucks is known from DE 138 15 780 which is intended to achieve continuously variable hydrostatic starting or reversing with reduced construction cost. The known transmission has a plurality of clutches and gearwheel switch stages. Emissionless operation of the driving system is not possible and the kinetic energy when braking and lowering loads cannot be recovered. Purely hydrostatic starting leads to poor transmission efficiency until switching to power branching transmission. Furthermore, reversing at maximum speed is not possible.

A hydrostatic-mechanical drive for industrial trucks is known from DE 197 47 459 which is intended to utilise the advantages of a hydrostatic drive combined with a mechanical drive, in that the total efficiency of the transmission is increased via the mechanical branch. Such a driving system can be designed such that it can be driven from a standstill to maximum speed, in a preferred direction of travel, with good transmission efficiency. In the other direction of travel the efficiency is low in the maximum speed range. Emissionless operation of the driving system is not possible and it is also not possible to recover braking- and lowering load energy.

A two-branch gear transmission and an operating method is known from DE 198 03 160 which is intended to improve the efficiency behaviour and the service life of the driving system. In addition, a rotary brake which is controllable depending on the driving state of the vehicle, is intended to stop a shaft temporarily or permanently when a shaft exceeds a maximum speed. Emissionless operation of the driving system, which is not designed for industrial trucks, is not possible and it is also not possible to recover braking- or load energy. Furthermore, reversing at maximum speed also cannot be achieved.

Combustion engine driven driving systems for industrial trucks are known from DE 199 55 311, DE 199 55 312 and DE 199 55 313, in which a combustion engine and at least one electric machine generate the drive energy. The known driving systems contain at least one collecting transmission for combining the energy of the combustion engine and the electric machine. It is therefore intended that the performance is improved as a whole, with continuously variable good controllability and an increase in total efficiency. The known driving systems require mechanical brakes in the driving state, in order to achieve the required minimum braking even at maximum speed and without oversized electric machines. The combustion engines in the known driving systems are rigidly connected to the subordinate transmission system so that during emissionless electrical operation, the combustion engine idles and is subject to loss.

The object of the invention is to produce a combustion engine driven, two-branched driving system for industrial trucks which can be operated without emissions, allows recovery of braking- and lowering load energy and, in particular, can dispense with mechanical brakes in the driving state.

BRIEF SUMMARY OF THE INVENTION

In the driving system according to the invention the combustion engine is coupled to a two-branch gear transmission of which one output shaft is coupled to a change-over transmission which in turn is coupled to a collecting transmission to apply the torque to at least one of the driven wheels of the industrial truck. The second drive train is formed from at least two electric machines of which one is coupled to the two-branch gear transmission such that between the electric machine and at least one of the first or second shafts of the two-branch gear transmission a constant torque ratio is produced. The first and second electric machines are coupled via an electrical circuit arrangement which in turn is connected to an electric accumulator, for example a battery. By activating the circuit arrangement the gear ratio between the electric machines can be set as desired, within limits. According to the invention two mechanical-hydraulic converters, for example hydraulic pumps, are provided of which one is coupled to the first or second shaft of the two-branch gear transmission and the second to the electric transmission. The mechanical-hydraulic converters can be employed to provide hydraulic functions of the industrial truck. One respective controllable means is also associated therewith for the absorption of hydraulic energy not required, for example in the form of a throttle.

In the driving system for industrial trucks according to the invention a two branch system is provided in which the one branch is mechanically arranged between the combustion engine and the output shaft, whilst an electric adjustable transmission is arranged in the other branch. Mechanical energy supplied to the electric adjustable transmission via the two-branch gear transmission is converted into electrical energy by means of the first electric machine operating as a generator. The electrical energy is converted into mechanical energy by means of the second electric machine operating in the form of an electric motor. Known drive controls for electric machines are capable of setting any gear ratios between the generator and electric motor within limits set by the electric machines.

When accelerating the combustion engine, the drive power of the combustion engine is distributed to the two branches in the two-branch gear transmission, depending on the speed ratios of the shafts of the two-branch gear transmission, the direction of the power flow resulting from the rate of the speed of the shafts. The gear ratio is continuously variably adjusted in the electric transmission and the accumulator (battery) associated with the electric transmission can remove energy from the driving system when required or supply energy thereto.

The power of the two branches is added together in a collecting transmission, the direction of the power flow resulting from the amount of torque on the shafts. In order to increase the total efficiency of the driving system irrespective of the drive state, the shaft of the combustion engine can be coupled at a fixed speed with the shaft of the primary branch.

In order to be able to drive in enclosed spaces, at least temporarily without emissions and with good efficiency, it is possible according to an embodiment of the invention to decouple the combustion engine mechanically from the remainder of the driving system, in particular by a clutch. In this operating state, the energy necessary for the driving- and lifting function of the industrial truck is taken from the accumulator associated with the electric transmission.

When braking, a portion of the kinetic energy of the industrial truck is taken out of the driving system by the electric machines and usefully stored in the accumulator. The remaining energy is taken up by the idling combustion engine and the two mechanical-hydraulic converters. It can, for example, be used by secondary hydraulic consumer applications (lifting function, tilting function, etc). If no power is required for secondary consumer applications the hydraulic power is dissipated by suitable means, for example by controllable throttles. The absorption of braking energy for a driving system for an industrial truck is known from EP 1403130 A2.

To alter the rotational direction of the wheels during the operation of the combustion engine, it can be switched between forwards and reverse drive by means of a change-over transmission in the primary branch.

As mentioned above, the secondary hydraulic consumer applications are supplied by at least one of the mechanical-hydraulic converters. The mechanical-hydraulic converters can, depending on the operating state, obtain hydraulic energy from mechanical energy or mechanical energy from hydraulic energy. The energy supplied to the driving system when lowering a load can be returned to the accumulator via the electric machines.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated The invention is to be described in more detail hereinafter with reference to the embodiments shown in the drawings, in which.

Figure 1:
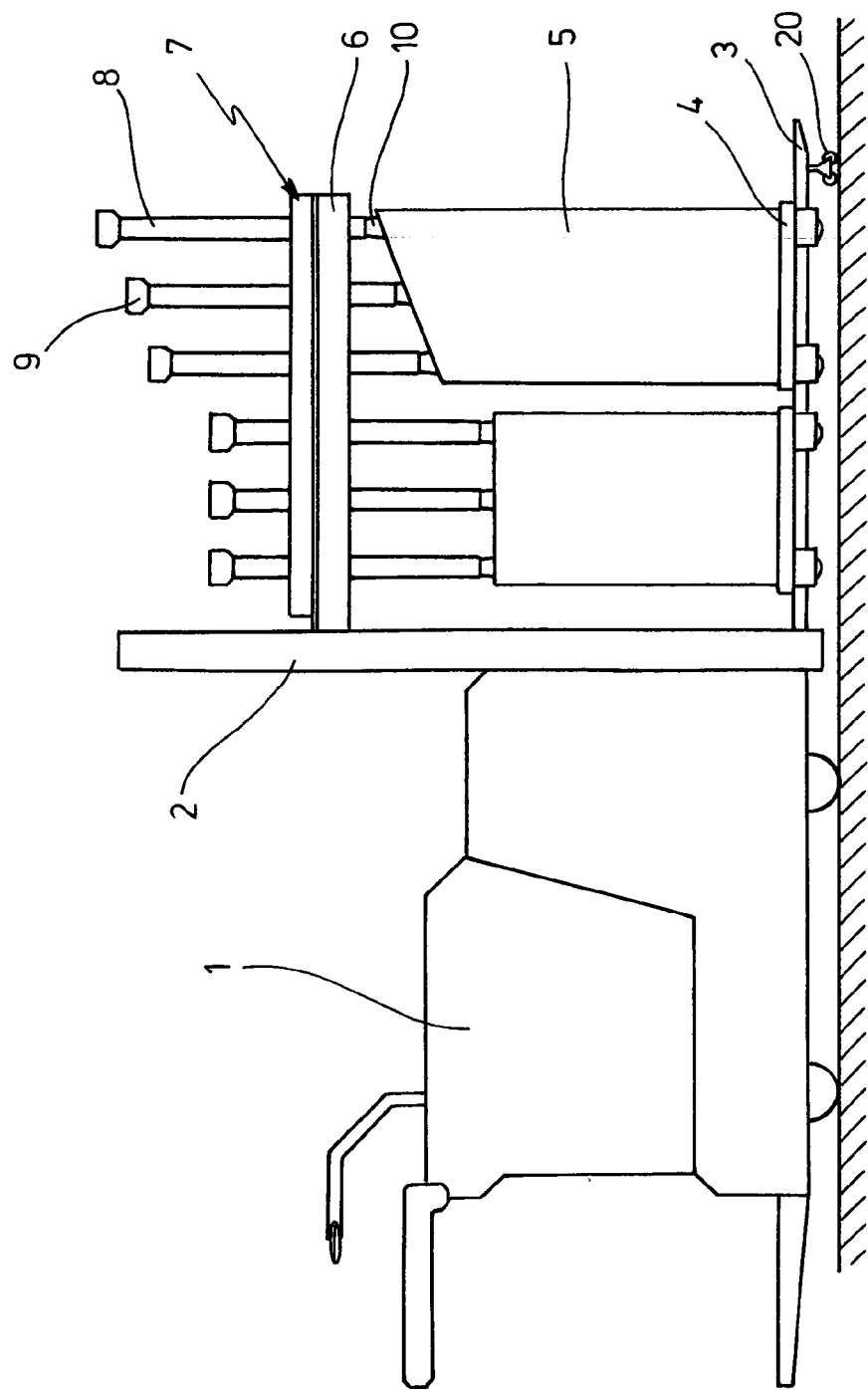
FIG. 1 is a diagrammatic view of a first embodiment of a driving system according to the invention.

In FIG. 1 a combustion engine 1 of an industrial truck, not shown further, is connected via a shaft and a clutch 2 to a two-branch gear transmission 5, which, for example, is a three shaft planetary transmission or a planetary gear. The two-branch gear transmission 5 distributes the power of the combustion engine 1 to two branches depending on the speed ratios of the shafts of the two-branch gear transmission 5. A change-over transmission 9 is integrated in the mechanical primary branch in order to be able to switch between forwards and reverse drive. In the secondary branch an electric adjustable transmission is integrated in the form of a first electric machine 8, a second electric machine 12 and an electrical circuit arrangement 11 arranged between the electric machines. By means of these parts the gear ratio can be continuously variably adjusted in the secondary branch. A battery 10 is connected to the circuit arrangement 11 and can remove energy from the system or supply it thereto.

The primary and secondary branches are coupled to a collecting transmission 13 to combine the power of the two branches. A differential 15 distributes the drive power from the collecting transmission 13 to two drive wheels 14, 16.

A first mechanical-hydraulic converter 3, for example a hydraulic pump, is coupled via a spur gear transmission 4 between the clutch 2 and the two-branch gear transmission 5. A second mechanical-hydraulic converter 7 is coupled via a spur gear transmission 6 to a shaft between the two-branch gear transmission 5 and first electric machine 8.

If emissionless operation with good efficiency is desired, the combustion engine 1 is decoupled via the clutch 2 from the driving system and the change-over transmission 9. The drive is exclusively carried out via the secondary branch, together with the electric machines 8, 12, their being supplied by the battery 10. The hydraulic functions of the industrial truck, not shown, are supplied by at least one of the converters 3, 7, the energy supply being also provided in this operating state from the accumulator 10.

When the vehicle brakes, the mechanical-hydraulic converters 3, 7 are driven. They can therefore either take braking energy because they supply secondary hydraulic functions or also because hydraulic energy, for example via throttles, is absorbed when hydraulic energy is not demanded by the consumer applications. This is indicated by hydraulic thermal energy converters 3a, 7a which are associated with the converters 3, 7 and can be activated (which is not shown). In addition, when said combustion engine is not decoupled from the driving system the combustion engine 1 idles via the drive wheels and the electric machines 12 and 8 are driven, operating as generators, whereby braking energy is fed back to the accumulator 10. Hydraulic energy generated when lowering loads is also converted by at least one of the converters 3, 7 and by the electric machine into electrical energy and supplied to the battery 10.

Figure 2:
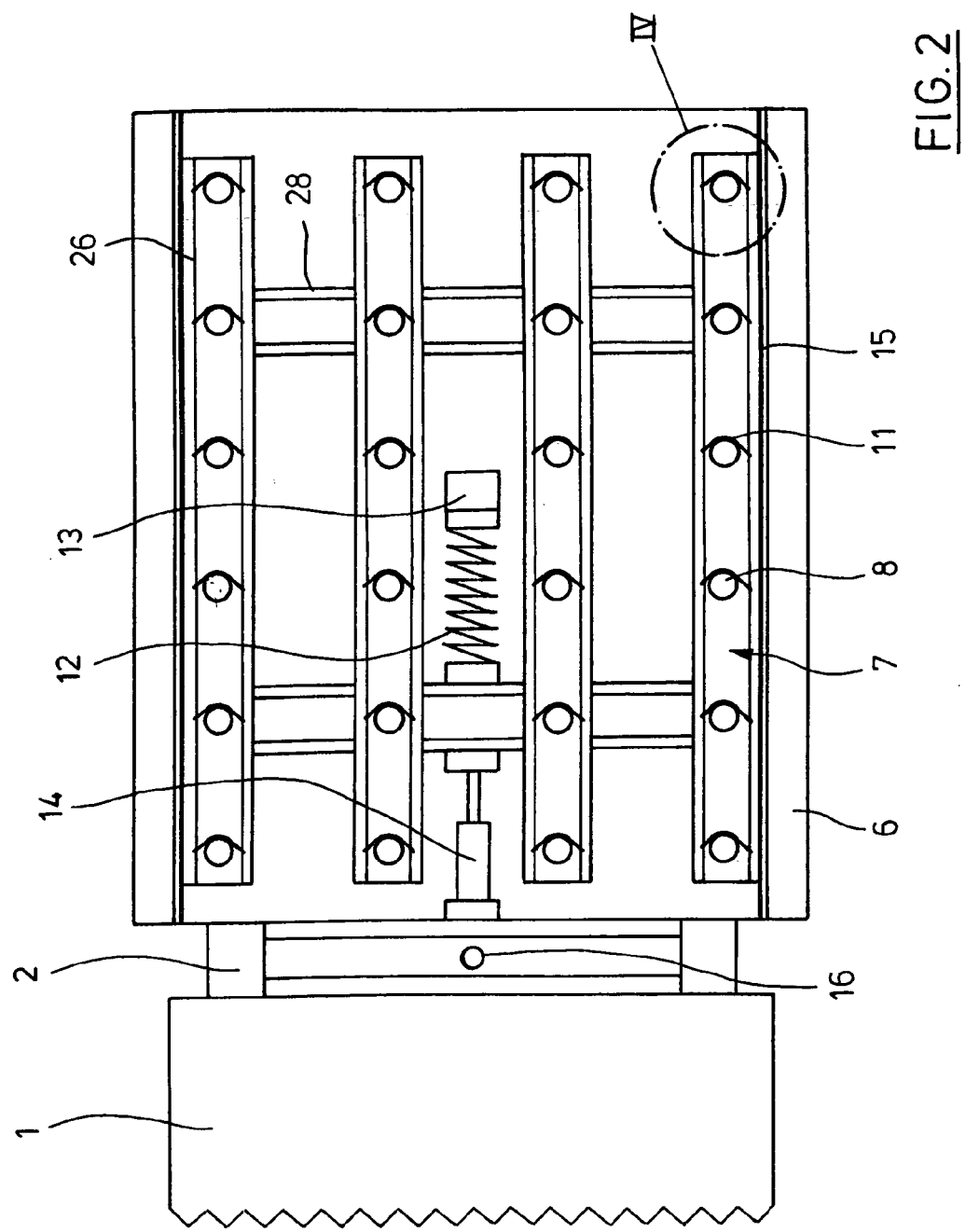
FIG. 2 is a diagrammatic view of a second embodiment according to the invention.
Figure 3:
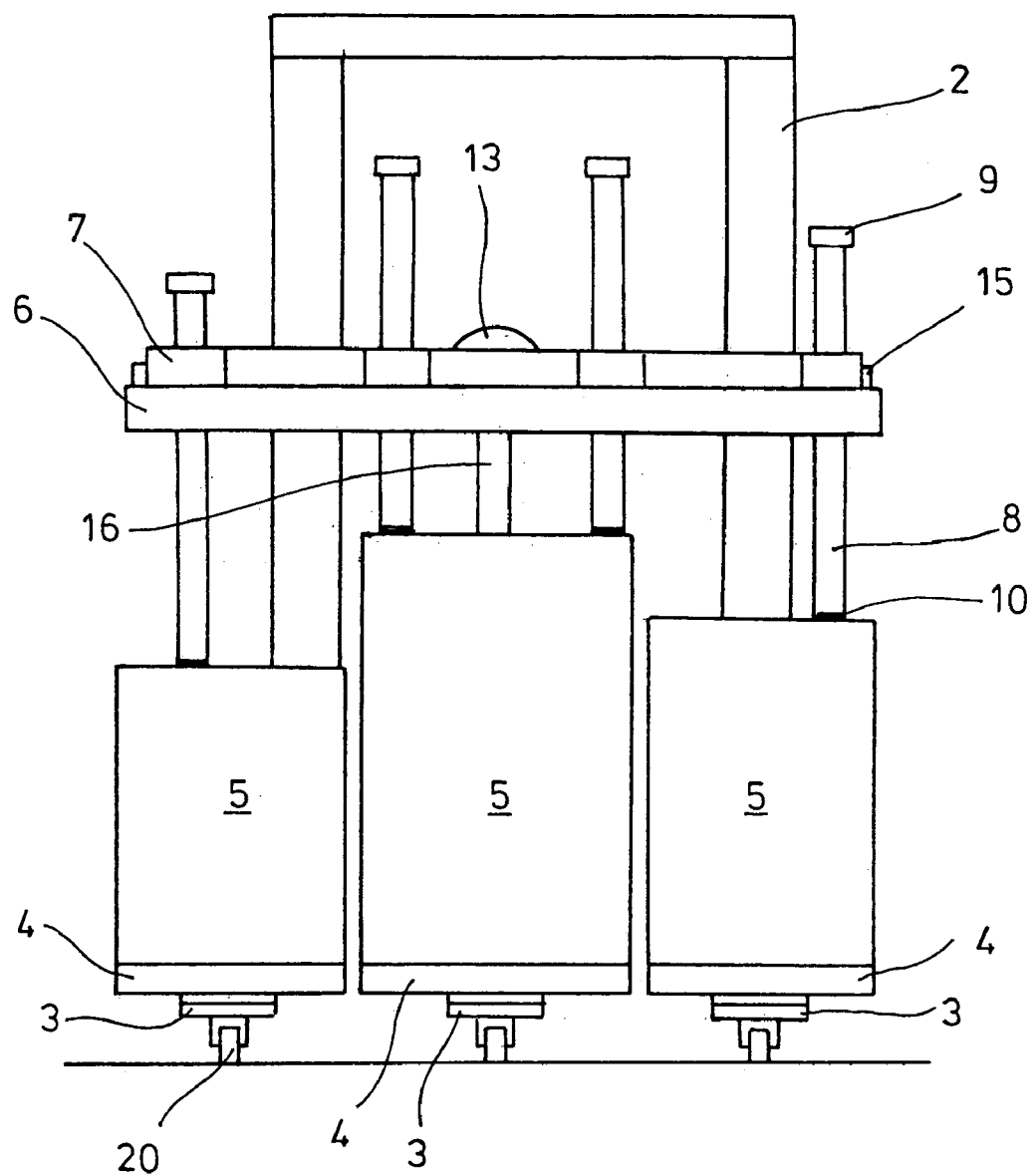
Figure 4:
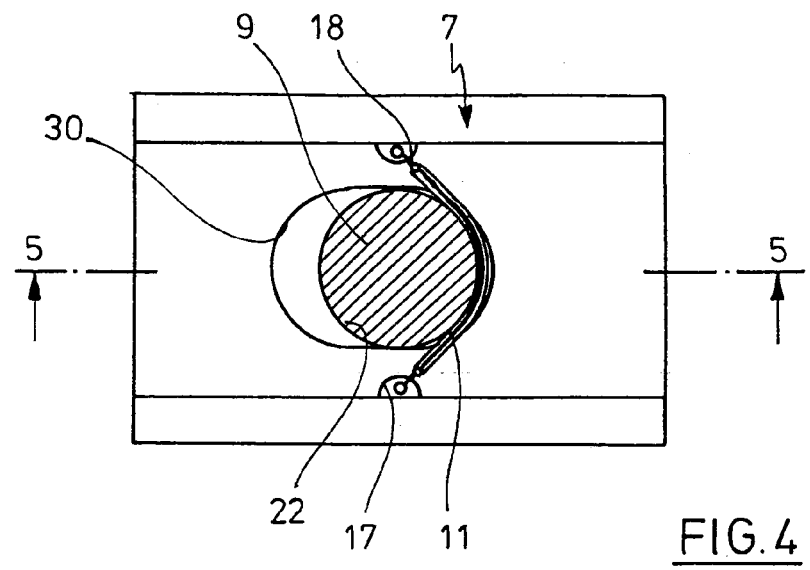
Figure 5:
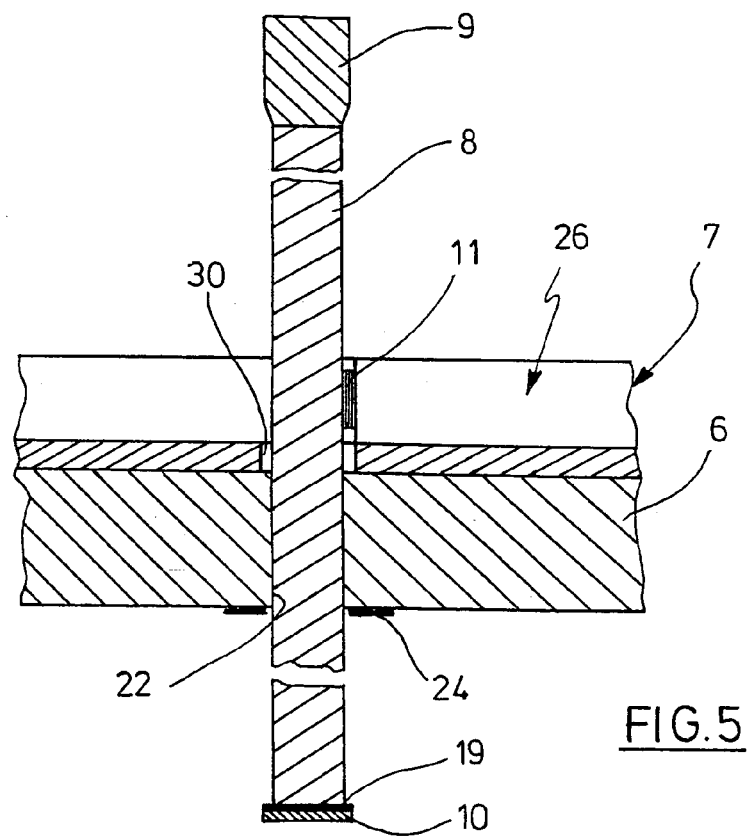
Figure 6:
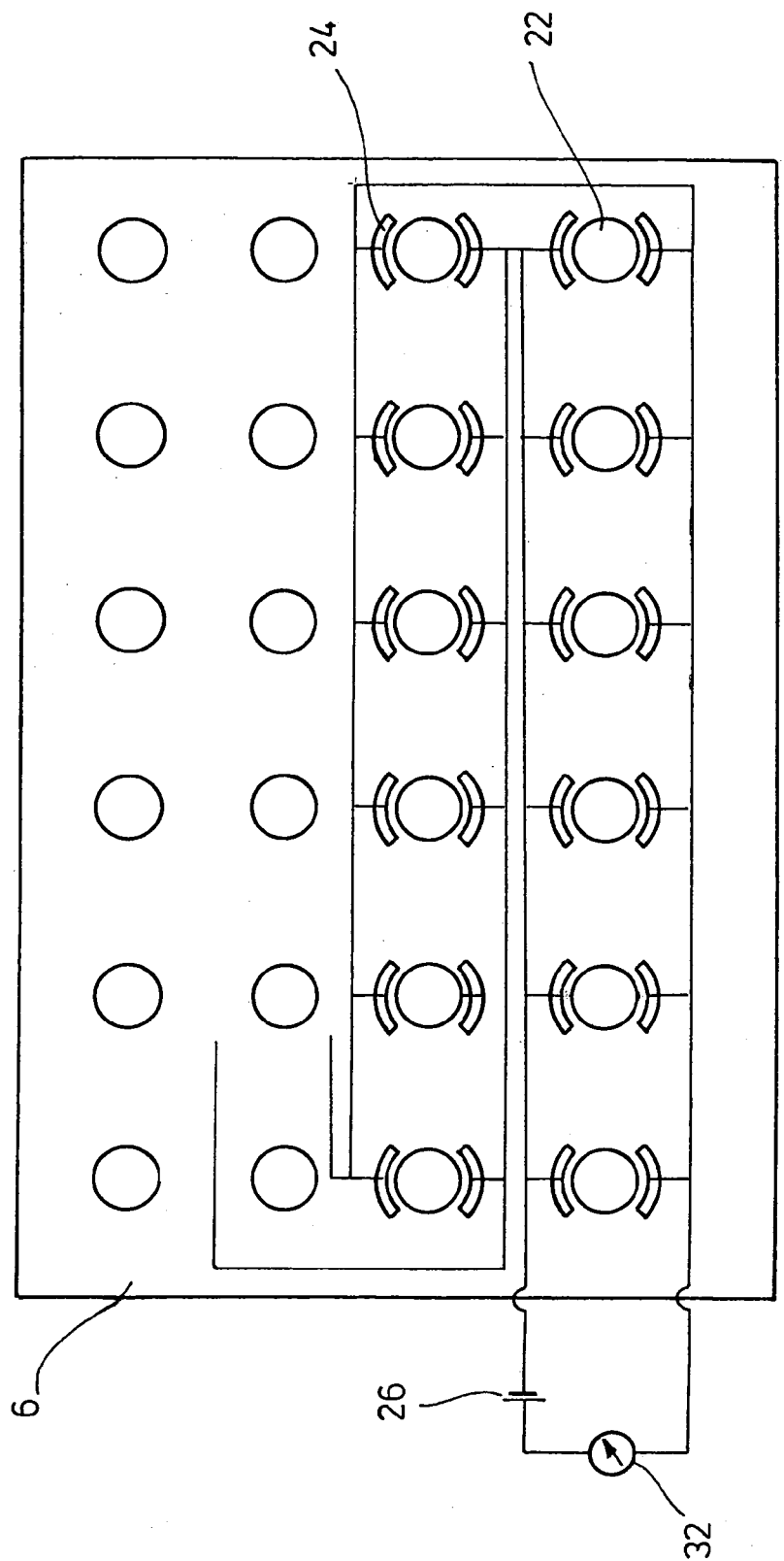
Figure 1:
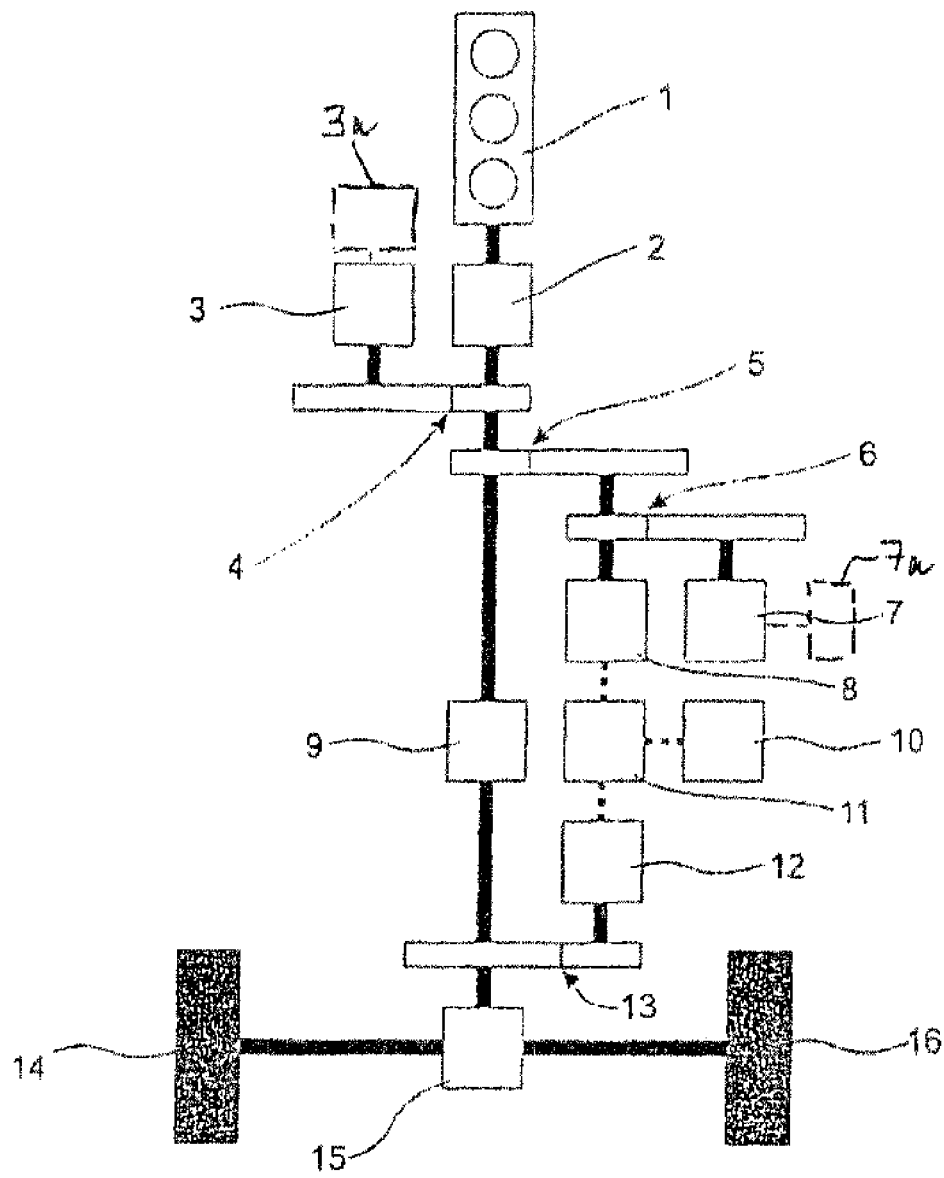
Figure 2:
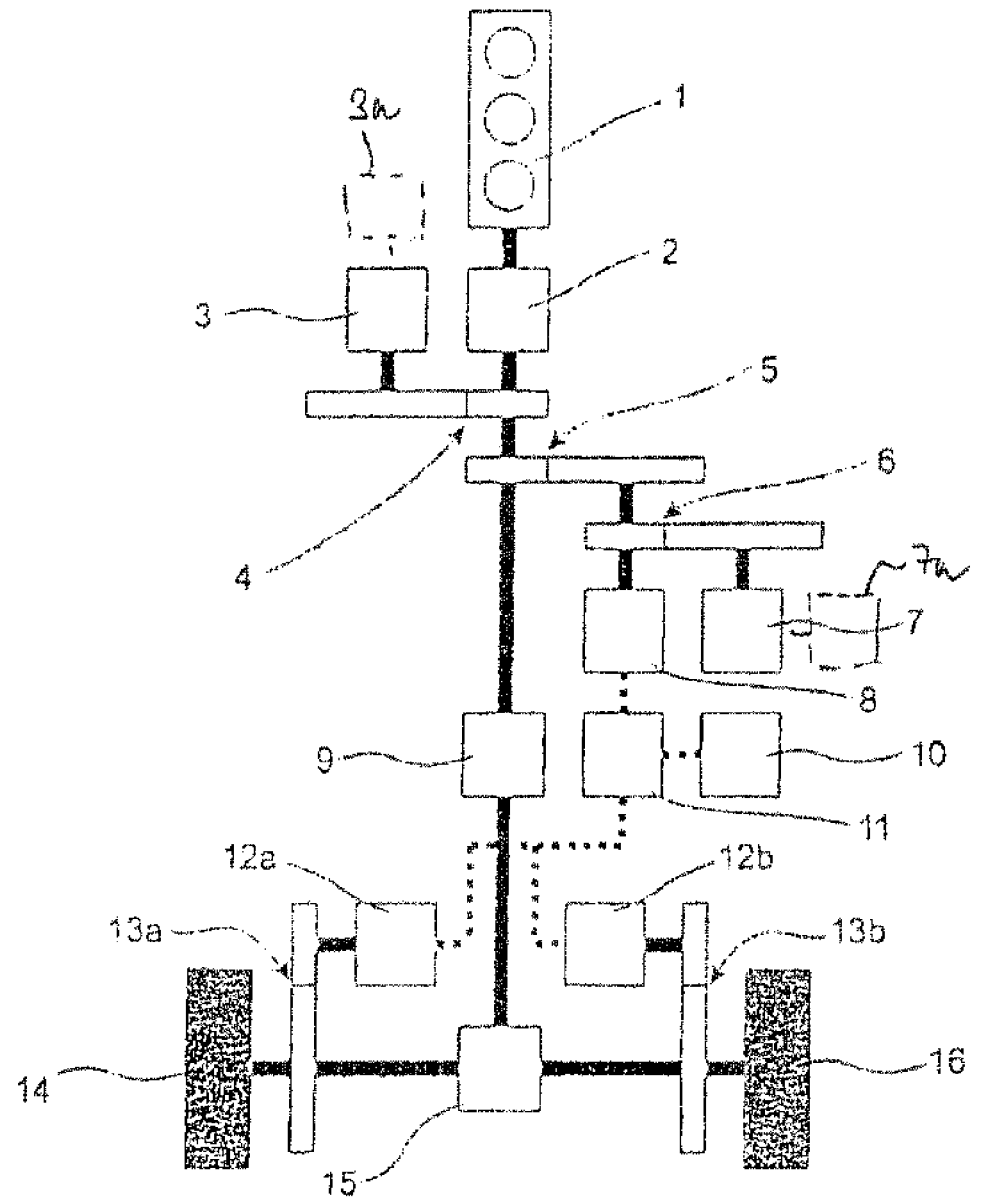

The embodiment according to FIG. 2 differs from that according to FIG. 1 in that instead of the electric machine 12 in FIG. 1, two electric machines 12a, 12b are provided which are coupled to the drive shaft via one respective individual collecting transmission 13a, 13b. An industrial truck, in which the speeds of the two electric machines 12a, 12b can be controlled, can negotiate such tight corners that the point of rotation lies between the drive wheels 14, 16. This has the advantage that by the increased manoeuvrability less working room is required and thus narrower aisles can be provided in a warehouse. Furthermore, by the intervention of control engineering in the dynamics of the electric machines 12a, 12b, the dynamic drive of the industrial truck can be positively influenced. As a result, conditions are created to increase the drive stability and thus the work safety of the industrial truck by means of an electronic control.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. Driving system for an industrial truck comprising
    a combustion engine (1), a two-branch gear transmission (5) having first and second shafts, the first shaft being coupled to the combustion engine (1), the second shaft being coupled to a change-over transmission (9), whose outlet acts on the driven wheels (14, 16) of the industrial truck using a collecting transmission (13, 13a, 13b), an electric transmission which a first electric machine (8) cooperates therewith, with respect to the torque, using the two-branch gear transmission (5), and a second electric machine (12, 12a, 12b) is coupled using at least one collecting transmission (13, 13a, 13b) to the driven wheels (14, 16), the two-branch gear transmission (5) producing a constant torque ratio between the first electric machine (8) and at least the first and second shaft and an electrical circuit arrangement (11) electrically coupling the electric machines (8 or 12, 12a, 12b) and being connected to an electric accumulator, two mechanical hydraulic converters (3, 7) one being coupled to the first or second shaft of the two-branch gear transmission (5) and the second being coupled to the electric transmission, and
    means for the absorption of hydraulic energy which are coupled with each mechanical hydraulic converter (3, 7).

2. Driving system according to claim 1, characterised in that controllable throttles are coupled with the mechanical-hydraulic converters (3, 7).

3. Driving system according to claim 1, characterised in that the combustion engine (1) is coupled to the input shaft of the two-branch gear transmission (5) using a clutch (2).

4. Driving system according to claim 1, characterised in that the electrical circuit arrangement (11) is designed such that the electrical energy of at least one of the electric machines (8, 12, 12a, 12b) operating as a generator can be stored in the accumulator (10).

5. Driving system according to claim 1, characterised in that at least one of the mechanical-hydraulic converters can be connected to hydraulic consumer applications of the industrial truck using a control means.

6. Driving system according to claim 1, characterised in that the electronic transmission comprises three electric machines (8, 12, 12a, 12b) of which two (12a, 12b) are connected in parallel and act on a drive wheel (14, 16) respectively using a collecting gear transmission (13a, 13b).

7. Driving system according to claim 1, characterised in that the two-branch gear transmission (5) is a three shaft planetary transmission.

8. Driving system according to claim 7, characterised in that a planetary gear system is provided.

9. A driving system for an industrial truck comprising:
    a two-branch gear transmission having an input shaft, a primary output shaft and a secondary output shaft, the input shaft being coupled to a combustion engine and the primary output shaft being coupled to a change-over transmission, the change-over transmission having an outlet;
    the outlet of the change-over transmission being coupled to a collecting transmission, which acts on a pair of driven wheels;

the secondary output shaft being coupled to an electric transmission, the electric transmission comprising first and second electric machines which are electrically coupled to an electrical circuit, the second electric machine being coupled to the collecting transmission;

the two-branch gear transmission producing a constant torque ratio between the fist electric machine and at least one of the primary output shaft and the secondary output shaft of the two-branch gear transmission;

the electric transmission being connected to an electric accumulator;

first and second mechanical hydraulic converters, the first being coupled to the input shaft of the two-branch gear transmission and the second being coupled to the electric transmission, and first and second throttles, the first throttle being coupled to the first mechanical hydraulic converter and the second throttle being coupled to the second hydraulic converter, for the absorption of hydraulic energy.

* * * * *

UNITED STATES PATENT AND TRADEMARK OFFICE
CERTIFICATE OF CORRECTION

PATENT NO. : 7,216,730 B2
APPLICATION NO. : 11/147684
DATED : May 15, 2007
INVENTOR(S) : Baginski et al.

It is certified that error appears in the above-identified patent and that said Letters Patent is hereby corrected as shown below:

Title of patent:

Item (75) add Inventors: Ralf Baginski, Neetze (DE); Rainer Bruns, [Kirchenheide] (DE) -- Hamburg --; [George Nissen, Kiebitzflehr (DE)] -- Nis-Georg Nissen, (DE) Brotkstedt (DE) --; Stefan Steiger, [Frankisch-Grumbach ] (DE) -- Frankisch-Crumbach--.

Replace the old existing drawings with the new drawings Fig. 1 and Fig. 2
Attached are two Replacement Sheets of drawings associated with the above patent.

Signed and Sealed this

Seventeenth Day of February, 2009

JOHN DOLL
*Acting Director of the United States Patent and Trademark Office*